US010917630B2

(12) United States Patent
Jin et al.

(10) Patent No.: US 10,917,630 B2
(45) Date of Patent: Feb. 9, 2021

(54) STEREOSCOPIC IMAGE DISPLAY DEVICE (71) Applicant: LG Display Co., Ltd., Seoul (KR)

(72) Inventors: You-Yong Jin, Seoul (KR); Byung-Joo Lee, Seoul (KR); Hee-Jin Im, Paju-si (KR); Tae-Young Heo, Seoul (KR); Jin-Hyuk Jang, Busan (KR); Won-Sik Lee, Busan (KR)

(73) Assignee: LG Display Co., Ltd., Seoul (KR)

( * ) Notice: Subject to any disclaimer, the term of this patent is extended or adjusted under 35 U.S.C. 154(b) by 304 days.

(21) Appl. No.: 15/364,019

(22) Filed: Nov. 29, 2016

(65) Prior Publication Data
US 2017/0163975 A1 Jun. 8, 2017

(30) Foreign Application Priority Data

Dec. 4, 2015 (KR) .................. 10-2015-0172645

(51) Int. Cl.
*H04N 13/305* (2018.01)
*H04N 13/31* (2018.01)
*G02B 30/25* (2020.01)
*G02B 30/27* (2020.01)

(52) U.S. Cl.
CPC .......... *H04N 13/305* (2018.05); *G02B 30/25* (2020.01); *G02B 30/27* (2020.01); *H04N 13/31* (2018.05)

(58) Field of Classification Search
CPC ..................................... H04N 13/31
See application file for complete search history.

(56) References Cited

U.S. PATENT DOCUMENTS

| | | | |
|---|---|---|---|
| 5,953,148 A * | 9/1999 | Moseley | G02B 27/2214 359/237 |
| 8,134,590 B2 | 3/2012 | De Zwart et al. | |
| 9,250,446 B2 | 2/2016 | Krijn et al. | |
| 9,690,109 B2 | 6/2017 | Jin et al. | |
| 2008/0204550 A1 | 8/2008 | De Zwart et al. | |
| 2009/0096726 A1 * | 4/2009 | Uehara | G02B 27/2214 345/84 |

(Continued)

FOREIGN PATENT DOCUMENTS

CN 101167371 A 4/2008
CN 103348687 A 10/2013

(Continued)

OTHER PUBLICATIONS

The State Intellectual Property Office of the People's Republic of China, First Office Action, CN Patent Application No. 201611101347.0, dated Nov. 14, 2018, 23 pages.

*Primary Examiner* — Mikhail Itskovich
(74) *Attorney, Agent, or Firm* — Fenwick & West LLP (57) ABSTRACT Disclosed is a stereoscopic image display device which separates views from each other to reduce crosstalk and minimizes reduction in brightness due to decrease of an opening area of sub-pixels. The stereoscopic image display device includes a display panel including first and second sub-pixels arranged in parallel in the horizontal direction in each of regions formed by intersecting a plurality of gate lines and a plurality of data lines, openings for opening a part of each of the first and second sub-pixels in a light-shielding pattern configured to shield regions of the first and second sub-pixels other than the openings, and a parallax unit located on the display panel and including a plurality of lenses.

20 Claims, 7 Drawing Sheets

(56) References Cited

U.S. PATENT DOCUMENTS

2014/0002897 A1    1/2014   Krijn et al.
2015/0185489 A1    7/2015   Jin et al.
2017/0139219 A1    5/2017   Lin

FOREIGN PATENT DOCUMENTS

| CN | 104730720 A | 6/2015 |
| CN | 104754318 A | 7/2015 |
| WO | WO 2014/189198 A1 | 11/2014 |

\* cited by examiner

STEREOSCOPIC IMAGE DISPLAY DEVICE

CROSS-REFERENCE TO RELATED APPLICATION

This application claims the benefit of Republic of Korea Patent Application No. 10-2015-0172645, filed on Dec. 4, 2015, which is hereby incorporated by reference as if fully set forth herein.

BACKGROUND OF THE INVENTION

Field of the Invention

The present invention relates to a stereoscopic image display device, and more particularly, to a stereoscopic image display device which adjusts a pitch of sub-pixels to prevent generation of 3D crosstalk and changes the structure of the sub-pixels to improve 3D brightness.

Discussion of the Related Art

Stereoscopic image display devices may be divided into a glasses type and a glasses-less type (i.e., an autostereoscopic type).

Thereamong, an autostereoscopic stereoscopic image display device displays a 3D image by installing an optical device, which may cause disparity between a left eye image and a right eye image, in front of a display screen. Such optical devices include a lenticular lens, a parallax barrier, etc.

The parallax barrier outputs a stereoscopic image by separating left and right images from each other through vertical slits arranged at designated intervals to transmit or block light, and the lenticular lens outputs a stereoscopic image by separating left and right images from each other by attaching a lenticular lens array to a display panel so as to cause left and right eyes to see different pixels.

In a conventional stereoscopic image display device, an optical viewing angle is generally determined by a pitch of unit lenses or unit slits in a specific cycle of a parallax unit and it is difficult to secure an optical viewing angle having a designated value or higher due to the resolution limits which may be imposed by the pitch.

Therefore, in order to increase the optical viewing distance, a method in which a separate gap glass is provided in front of or at the rear of a parallax unit has been proposed but, in this case, the thickness of a stereoscopic image display device is increased and thus slimming of the device is difficult.

In the conventional stereoscopic image display device, a picture is divided into a plurality of views and brightness deviation is removed by overlapping the views. Thus, the conventional stereoscopic image display increases generation of crosstalk due to overlapping of the views.

SUMMARY OF THE INVENTION

An object of the present invention is to provide a stereoscopic image display device which separates views from each other to reduce crosstalk and minimizes reduction in brightness due to decrease of an opening area of sub-pixels.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display device includes a display panel including a plurality of sub-pixel units, each of the sub-pixel units including a first sub-pixel and a second sub-pixel arranged in parallel in a horizontal direction to the first sub-pixel, a plurality of gate lines and a plurality of data lines, wherein each of the sub-pixel units is defined by intersecting of the plurality of gate lines and the plurality of data lines and a light-shielding pattern having a first opening for exposing at least a part of the first sub-pixel and a second opening for exposing at least a part of the second sub-pixel, the light-shielding pattern configured to shield regions of the sub-pixel unit other than the first and second openings, and a parallax unit on the display panel and having a lens pitch corresponding to a width of the first opening multiplied by a number of views displayed by the display panel. The light-shielding pattern may be a common line pattern, a black matrix pattern, or may be a pattern separate from the common line pattern and the black matrix pattern.

The stereoscopic image display device may also comprise a plurality of sub-pixel units grouped into a plurality of sub-pixel groups, each sub-pixel group including a first number of rows of sub-pixel units and a second number of columns of sub-pixel units, wherein the second number is smaller than the first number. The width of the first and second openings may correspond to a width of the sub-pixel groups multiplied by the second number divided by the first number.

The first and second openings may have a parallelogram shape inclined with respect to the vertical direction, and the lens of the parallax units may be inclined with respect to the vertical direction at an inclination angle of the first and second openings. The inclination angle of the first and second openings may correspond to arctangent of the second number divided by a product of a ratio and the first number, wherein the ratio is based on a vertical length of the sub-pixel units to a horizontal width of the sub-pixel units.

The second number may be 1 and the first and second openings may be located in two of candidate regions with largest areas that overlap with the first and second sub-pixels, wherein each sub-pixel unit is divided into a first number of the candidate regions of a same area. Each of the first and second openings may be located in any one of regions, each region corresponding to a horizontal pitch of lenses of the parallax unit divided by the number of views to be displayed, and wherein openings located in a same region display images of a same view and openings located in different regions display images of different views. First and second openings adjacent to each other in the vertical direction may be shifted from each other by the width of the first or second openings.

Each of the sub-pixel units may include first and second thin film transistors provided with gate electrodes connected to different gate lines and source electrodes connected to different data lines and a common line connection part located between the first and second sub-pixels to interconnect first and second common lines disposed in parallel with the gate lines.

The first sub-pixel may include a corresponding first thin film transistor; a first pixel electrode connection part connected to drain electrode of the first thin film transistor through a first contact hole, in a layer above a part of the first common line and the common line connection part such that an insulating film is interposed therebetween, and form a first storage capacitor protruding in the direction of the common line connection part; a plurality of first pixel electrode finger parts extending from the first pixel electrode connection part and arranged in a zigzag shape in a vertical direction of the first sub-pixel; and a first common electrode arranged between the first pixel electrode finger parts and connected to any one of the common lines through a third contact hole.

The second sub-pixel may include a corresponding second thin film transistor; a second pixel electrode connection part connected to a drain electrode of the second thin film transistor through a second contact hole, located in a layer above a part of the second common line and the common line connection part such that an insulating film is interposed therebetween, and thus forming a second storage capacitor protruding in the direction of the common line connection part; a plurality of second pixel electrode finger parts extending from the second pixel electrode connection part and arranged in a zigzag shape in a vertical direction of the second sub-pixel; and a second common electrode arranged between the second pixel electrode finger parts. The second common electrode may be formed integrally with the first common electrode.

In another aspect of the present invention, a stereoscopic image display device includes a display panel including a plurality of gate lines, a plurality of data lines intersecting with the plurality of gate lines, a plurality of sub-pixel units, each of the sub-pixel units including at least a first sub-pixel and a second sub-pixel adjacent to the first sub-pixel, the first sub-pixel and the second sub-pixel connected to different gate lines and different data lines, and a light shielding pattern having a first opening and a second opening, the light shielding pattern configured to shield light from the first and second sub-pixels in regions other than the first and second openings; and a plurality of lenses on the display panel. The plurality of lenses may have a lens pitch corresponding to a width of the first openings multiplied by a number of views displayed by the display panel.

The first and second sub-pixels in a same sub-pixel unit may be at a same vertical location, and no gate line may extend between first and second sub-pixels in a same sub-pixel unit. Each of the first and second openings may have a parallelogram shape having two sides extending parallel to the plurality of gate lines and remaining two sides inclined with respect to the plurality of data lines at an inclination angle, and each of the lens areas may be inclined with respect to the plurality of data lines at the inclination angle.

The plurality of sub-pixel units arranged on the display panel may be grouped into a plurality of sub-pixel groups. Each sub-pixel group may include a first number of rows of sub-pixel units and a second number of columns of sub-pixel units, wherein the second number is smaller than the first number. A width of the first and second openings may correspond to a width of the sub-pixel groups multiplied by the second number divided by the first number. The inclination angle may be defined as arctangent of the second number divided by a product of a ratio and the first number, wherein the ratio is based on a vertical length of the sub-pixel units to a horizontal width of the sub-pixel units.

The second number may be 1, and the first and second openings are located in two of candidate regions with largest areas that overlap with the first and second sub-pixels, wherein each sub-pixel unit is divided into a first number of candidate regions of a same area.

Each of the first and second openings may be located in any one of regions, each region corresponding to a horizontal pitch of the lenses by a number of views to be displayed on the display panel. The openings located in a same region may display images of a same view and openings located in different regions may display images of different views.

Each of the sub-pixel units may comprise a common line connection part, the common line connection part located between the first and second sub-pixels to interconnect first and second common lines parallel with gate lines.

The first and second sub-pixels may include a corresponding first and second storage capacitors. Each of the first and second storage capacitors may include an electrode extending in the direction of the common line connection part and an electrode formed by the common line connection part and have a shape protruding in a direction of the common line connection part from a plan view.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the present invention rather unclear. Further, names of elements used in description below are selected in consideration of ease of preparation of the specification and may thus differ from names of parts of an actual product.

Figure 1:
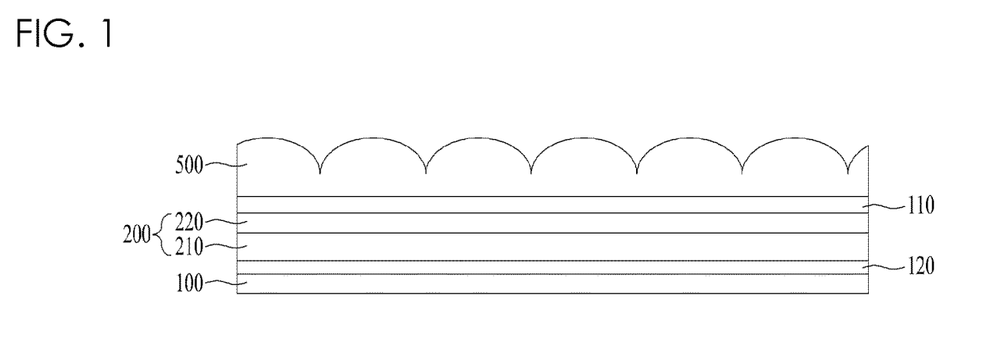
FIG. 1 is a schematic view illustrating a stereoscopic image display device in accordance with an embodiment of the present invention.

FIG. 1 is a schematic view illustrating a stereoscopic image display device in accordance with an embodiment of the present invention.

The stereoscopic image display device in accordance with an embodiment of the present invention includes a display panel 200 having a plurality of sub-pixels provided in a matrix and displaying an image, and a parallax unit 500 located on the display panel 200 and separating the image into a plurality of views.

A light source unit 100 shown in the figure transmits light, emitted from a light source unit disposed on the side surface or at the lower portion of the light source unit 100, in the upward direction, and includes the light source and a plurality of optical sheets. The light source unit 100 may be omitted depending on types of the display panel 200. For example, if the display panel 200 is a display panel using a self-luminous optical element, such as an organic light emitting display panel or an electrophoretic display panel, the light source unit 100 may be omitted and, if the display panel 200 is a light receiving element, such as a liquid crystal display panel, the light source unit 100 is provided.

The light source used in the light source unit 100 may be a fluorescent lamp array, light emitting diodes (LEDs), or a laser light source array, and the light source unit 100 may include a plurality of optical sheets, such as a light guide panel, a diffuser sheet, etc., to guide surface emission from the bottom to the display panel 200.

The display panel 200 may be a light-transmitting image panel or a light-receiving image panel. FIG. 1 illustrates the stereoscopic image display device including the light source unit 100 and, in this case, it will be assumed that the display panel 200 is a light-receiving image panel. However, if the light source unit 100 is omitted, the stereoscopic image display device may be implemented using only a barrier (not shown), the display panel 200 and the parallax unit 500.

If the display panel 200 is a liquid crystal panel, the display panel 200 includes a lower plate 210 and an upper plate 220 opposite to each other, a liquid crystal layer interposed between the lower and upper plates 210 and 220, a thin film transistor (TFT) array disposed on the lower plate 210, and a color filter array disposed on the upper plate 220.

If the display panel 200 is a liquid crystal panel, the display panel may further include first and second polarizing plate 110, 120. The first polarizing plate 110 is located on the upper plate 220, and the second polarizing plate 120 is located between the light source unit 100 and the lower plate 210.

Liquid crystal cells are driven by an electric field between pixel electrodes to which data voltage is supplied through the TFT and a common electrode to which common voltage is supplied. A gate electrode of the TFT is connected to a gate line, a source electrode of the TFT is connected to a data line, and a drain electrode of the TFT is connected to the pixel electrode of the liquid crystal cell. The TFT is turned on by a gate pulse supplied through the gate line and supplies data voltage from the data line to the pixel electrode of the liquid crystal cell.

If the display panel 200 is an organic light emitting panel, the display panel 200 may include a driving transistor array (not shown) provided on the lower plate 210 and an organic light emitting diode array (not shown) provided thereon. The driving transistor array and the organic light emitting diode array on the lower plate 210 are sealed by the upper plate 220. Alternatively, the upper plate 220 may be omitted.

A plurality of sub-pixels are arranged on the display panel 200 of an embodiment of the present invention in a matrix. Here, a light-shielding pattern is formed on the region of the sub-pixel other than an opening. Here, if the display panel is a liquid crystal panel, the light-shielding pattern may be formed using a common line supplying a common voltage to the display panel or be formed using a black matrix layer. Further, the light-shielding pattern may be formed using various methods, such as a method using a separate light-shielding layer. The light-shielding pattern opens only a part of the region of each of the sub-pixels and thus serves to decrease an optical pitch of the sub-pixels when the stereoscopic image display device displays a 3D image. Here, since an optical viewing distance is inversely proportional to an optical pitch under the same optical gap conditions, if the optical pitch of the sub-pixels is decreased, the optical viewing distance of the stereoscopic image distance is increased. Further, if the optical pitch of the sub-pixels is decreased, views of the sub-pixels displaying different views do not overlap and the sub-pixels respectively display separated views, thus reducing 3D crosstalk. The structure of the sub-pixels of the display panel 200 will be described later.

The parallax unit 500 may be, for example, a lenticular lens array in which lenses having a designated pitch are regularly arranged in the horizontal direction. Further, the lenticular lens array may have a lens shape having a shown designated curvature, or may be a switchable lens array which is turned on/off by voltage and adjusts variation in a refractive index. If the lenticular lens is a switchable lens array, the stereoscopic image display device may selectively display a 3D or 2D image according to the on/off operation of the switchable lens array. In this case, the switchable lens array includes first and second substrates opposite each other, a liquid crystal layer interposed between the first and second substrates, a common electrode provided on the second substrate, and a plurality of first electrodes provided on the first substrate so as to correspond to lens areas, each of which corresponds to one pitch.

If the switchable lens array displays a 3D image, the highest voltage is applied to the first electrode, which is located at the center of the lens area, gradually reduced voltage is applied to regions that are increasingly farther away from the center of the lens area, and the lowest of the voltages applied to the first electrodes is applied to a second electrode. Here, the center of the lens area has the smallest refractive index, and a region which is gradually farther away from the center of the lens area has a gradually increased refractive index, and thus an optical refractive index difference that is the same as that of lenticular lenses is acquired, and an image from the display panel 200 is separated into respective views.

Further, if the switchable lens array displays a 2D image, a difference of refractive indexes between first electrodes and a common electrode is removed and thus the switchable lens array functions as a transparent film and displays the image of the display panel disposed to the bottom of the switchable lens array as is.

Figure 2:
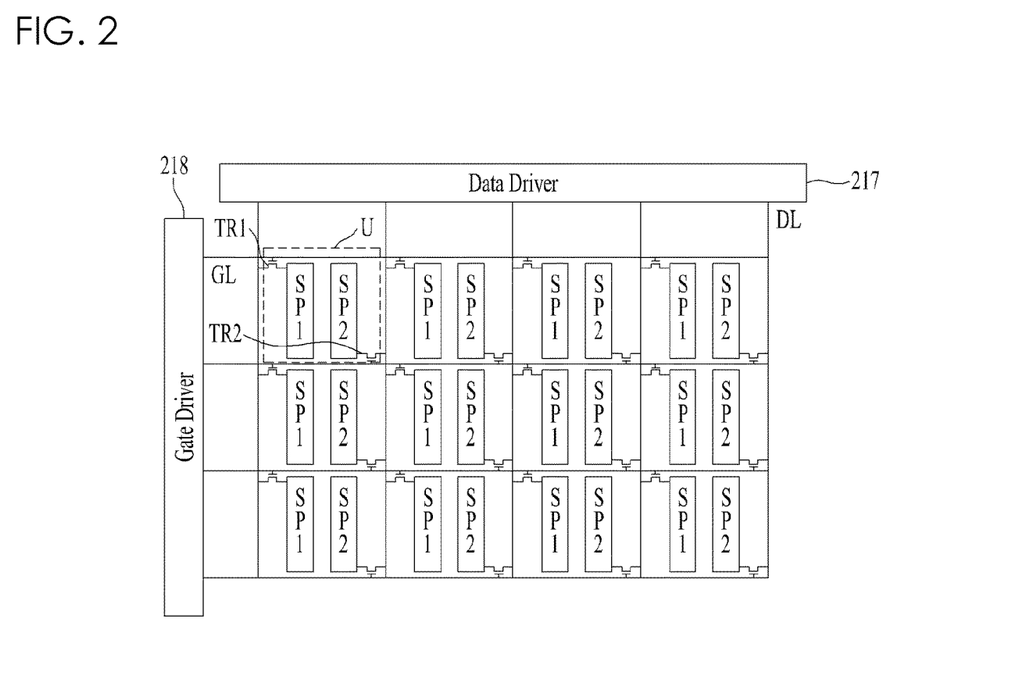
FIG. 2 is an exemplary view briefly illustrating the structure of sub-pixels of a display panel in accordance with an embodiment of the present invention.
Figure 3A:
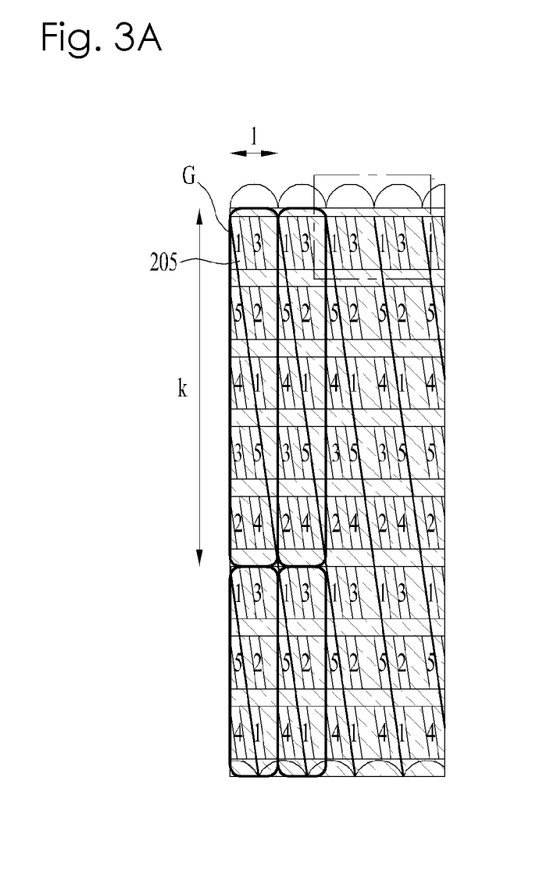
FIGS. 3A, 3B and 3C are exemplary views illustrating the shape of openings of the sub-pixels and a display area thereof in accordance with an embodiment of the present invention in detail.
Figure 3B:
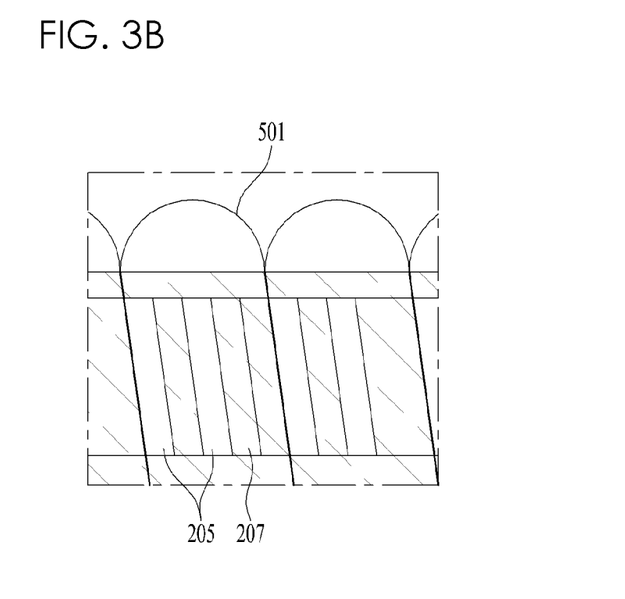
Figure 3C:
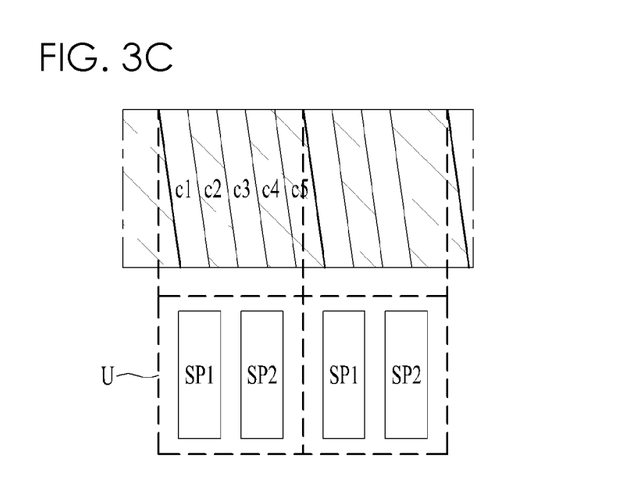

FIG. 2 is an exemplary view briefly illustrating a structure of the sub-pixels SP of the display panel 200 in accordance with an embodiment of the present invention, and FIGS. 3A to 3C are exemplary views illustrating the shape of openings of the sub-pixels and a display area thereof in accordance with an embodiment of the present invention in detail.

A plurality of sub-pixel units U, each of which is defined in a region formed by intersecting a plurality of gate lines GL and a plurality of data lines DL, is located in the display panel 200. Each sub-pixel unit U includes first and second sub-pixels SP1 and SP2. Each sup-pixel includes display part adjacent to the display part of the other sup-pixel and belongs to the same sub-pixel unit U to centralize display parts of the first and second sub-pixels SP1 and SP2. The gate lines GL are connected to a gate driver 218 and receive a gate signal from the gate driver 218, and the data lines DL are connected to a data driver 217 and receive a data signal from the data driver 217. Here, the gate driver 218 and the data driver 217 may be provided in the display panel in a Gate-In-Panel (GIP) manner.

In the sub-pixel unit U, first and second sub-pixels SP1 and SP2 are arranged in parallel in the horizontal direction.

Here, the sub-pixel unit U is located between the $n^{th}$ (n being a natural number of 1 or more) gate line and the $n+1^{th}$ gate line and between the $m^{th}$ (m being a natural number of 1 or more) data line and the $m+1^{th}$ data line.

The first sub-pixel SP1 receives data voltage from the $m^{th}$ data line through a first transistor TR1 controlled by a gate signal from the $n^{th}$ gate line. The second sub-pixel SP2 receives data voltage from the $(m+1)^{th}$ data line through a second transistor TR2 controlled by a gate signal from the $n+1^{th}$ gate line.

FIGS. 3A to 3C are exemplary views illustrating the shape of openings 205 for exposing the first and second sub-pixels SP1 and SP2 and relations between the openings 205, the sub-pixels SP and the lenses 501.

As illustrated in FIG. 3B, a shielding pattern 207 is formed at regions other than the openings 205.

The vertical pitch of each of the openings 205 exposing the first and second sub-pixels SP1 and SP2 shown in FIGS. 3A to 3B is about twice the vertical pitch of an opening of a sub-pixel of a conventional stereoscopic image display device. This will be described in detail with reference to FIG. 4.

Figure 4:
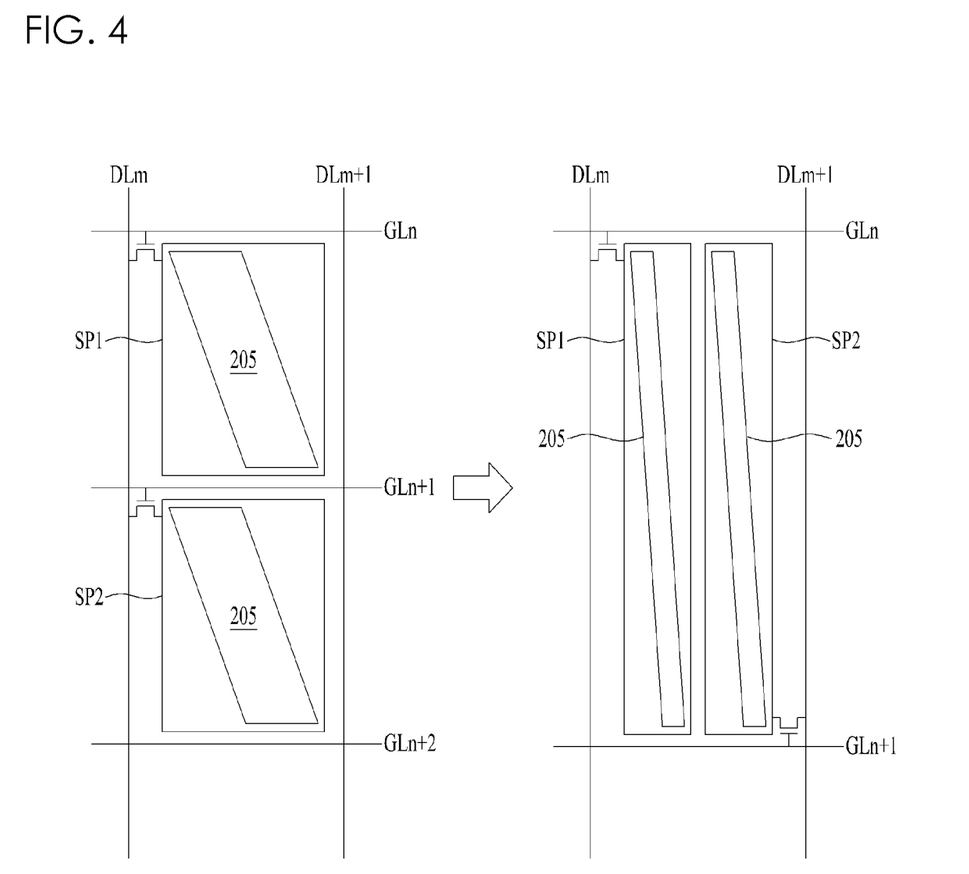
FIG. 4 is exemplary views for comparing the structures of the sub-pixels and the openings in accordance with an embodiment of the present invention to those of a conventional stereoscopic image display device.

FIG. 4 is exemplary views for comparing the structures of the sub-pixels and the openings in accordance with an embodiment of the present invention to those of a conventional stereoscopic image display device;

With reference to FIG. 4, one conventional sub-pixel is located in a region formed by two neighboring gate lines GLn, GLn+1 and two data lines DLm, DLm+1.

On the other hand, an interval between neighboring gate lines GLn, GLn+1 in accordance with an embodiment of the present invention is twice the interval between the neighboring gate lines GLn, GLn+1 of the conventional one.

Furthermore, an interval between neighboring data lines DLm, DLm+1 in accordance with the an embodiment of present invention is the same as the interval between the neighboring data lines DLm, DLm+1 of the conventional structure as shown in the left side of FIG. 4. In addition, in an embodiment of the present invention, two sub-pixels SP1 and SP2 are arranged in the horizontal direction in a region formed by the two neighboring gate lines GLn, GLn+1 and the two neighboring data lines DLm, DLm+1. Therefore, the vertical length of each of the sub-pixels SP1 and SP2 of the structure according to the embodiment (shown in the right side of FIG. 4) is about twice that of the conventional sub-pixel (shown in the left side of FIG. 4), and the horizontal width of each of the sub-pixels SP1 and SP2 of the structure according to the embodiment (shown in the right side of FIG. 4) is about half that of the conventional sub-pixel (shown in the left side of FIG. 4).

Therefore, the vertical pitch of the openings 205 provided on the sub-pixels SP1 and SP2 to open the sub-pixels SP1 and SP2 of the embodiment is about twice the vertical pitch of openings of the stereoscopic image display device having the conventional structure, and the horizontal pitch of the openings 205 of the embodiment is about half the horizontal pitch of the openings of the stereoscopic image display device having the conventional structure.

That is, the stereoscopic image display device in accordance with the embodiment of the present invention is characterized in that two sub-pixels, i.e., the first and second sub-pixels SP1 and SP2, are arranged in parallel in the horizontal direction, where each sub-pixel has a horizontal pitch less than half that of the conventional sub-pixels and a vertical pitch about twice that of the conventional sub-pixels.

As described above, if the optical pitch of sub-pixels is decreased by decreasing the horizontal width of the openings of the sub-pixels, an optical viewing distance (ODD) is increased, but the area of the openings of the sub-pixels is greatly reduced and thus brightness of the stereoscopic image display device is reduced. However, in an embodiment of the present invention where the horizontal width of the openings 205 of the sub-pixels SP1 and SP2 is decreased but the vertical length of the sub-pixels SP1 and SP2 is increased, the openings 205 are concentrated at the central part of the sub-pixel unit U and thus the total area of the openings 205 of the display panel 100 is increased. Therefore, the stereoscopic image display device in accordance with an embodiment of the present invention may minimize reduction in brightness while securing a stable ODD.

Here, in the stereoscopic image display device in accordance with an embodiment of the present invention, the two sub-pixels SP1 and SP2 are arranged in the horizontal direction, unlike conventional sub-pixels provided vertically adjacent to each other, and thus the number of gate lines and the number of data lines to drive the stereoscopic image display device are the same as those of a conventional stereoscopic image display device. That is, the stereoscopic image display device in accordance with an embodiment of the present invention may reduce decrease in brightness due to decrease in the area of the openings 205 of the sub-pixels PS without changing the number of gate lines and the number of data lines.

The respective sub-pixels PS display an image through the openings 205 having a parallelogram shape inclined with respect to the vertical direction. Here, an opening located on the first sub-pixel SP1 may be referred to as a first opening, and an opening located on the second sub-pixel SP2 may be referred to as a second opening. The lenses 501 provided on the parallax unit 500 are formed to have a semi-circular column shape having a cross-section covering the sub-pixels PS and inclined to be similar to the inclination angle of the parallelogram-shaped openings 205. By inclining the lenses 501 of the parallax unit 500 at a designated angle, the stereoscopic image display device in accordance with an embodiment of the present invention displays views, displayed by the respective sub-pixels, without overlapping of the views through the structure of the parallelogram-shaped openings 205.

Although FIGS. 3A to 3C illustrates that an inclination angle of the openings 205 and an inclination angle of the lenses 501 coincide with each other, if the inclination angle of the openings 205 for exposing the sub-pixels PS and an inclination angle of the lenses 501 of the parallax unit 500 do not accurately coincide with each other and are mismatched, brightness deviation of the stereoscopic image display device may be further reduced. In one embodiment, the inclination angle of the lens (lenses 501) may not align to match with the inclination angle of the first and second openings (openings 205).

The unit pixels U arranged on the display panel 200 of the stereoscopic image display device in accordance with an embodiment of the present invention are grouped into a plurality of sub-pixel groups G, each of which includes a matrix of a first number, k, sub-pixel units arranged in the vertical direction (k being a natural number) and a second number, 1, sub-pixel units arranged in the horizontal direction (1 being a natural number smaller than k). Here, the values of k and 1 are used to determine the inclination angle of the openings 205 of the sub-pixels PS and the inclination angle of the lenses 501 of the parallax unit 500 and to determine the horizontal width of the openings 205 for exposing the respective sub-pixels PS. Here, in the stereoscopic image display device in accordance with an embodiment of the present invention, if the value of 1 is 1, minimization of brightness deviation and prevention of crosswalk are most improved.

The inclination angle of the parallelogram-shaped openings 205 may be defined as atan(l/rk). Here, the value of r means the ratio of the vertical length of the sub-pixel units U to the horizontal width of the sub-pixel units U on the assumption that the horizontal width of a sub-pixel units U is 1.

As described above, the inclination angle of the lenses 501 of the parallax unit 500 corresponds to the inclination angle of the openings 205. Here, the inclination angle of the lenses 501 of the parallax unit 500 may be the same as the inclination angle of the openings 205 but, if the inclination angle of the lenses 501 of the parallax unit 500 is slightly different to the inclination angle of the openings 205, brightness deviation reducing effects may be acquired. The pitch of the lenses 501 is the same as a value acquired by multiplying the width of the openings 205 by the number of views to be displayed by the stereoscopic image display device. The width of the openings 205 will be described later.

With reference to FIGS. 3A and 3C, each opening 205 is located in any one of regions having a width corresponding to a value, acquired by dividing the pitch of the lenses 501 by the number of views to be displayed. In FIGS. 3A and 3B, it is assumed that the stereoscopic image display device displays a 5-view image. The number of the openings 205 of FIG. 3C means the number of displayed views.

If the stereoscopic image display device displays a 5-view image, as exemplary shown in FIGS. 3A and 3B, each opening 205 is located in any one of 5 regions acquired by dividing into the area of the lens 501 into 5 parts in the horizontal direction. Here, the openings 205 displaying the same view are located in the same regions of the lenses 205.

On the assumption that the stereoscopic image display device displays a view 1 to a view 5, as exemplary shown in FIG. 3A, the openings 205 located in the first to fifth regions of the lenses 501 may sequentially display the view 1 to the view 5. That is, among the fifth regions, the openings 205 located in the first regions may display the view 1, the openings 205 located in the second regions may display the view 2, the openings 205 located in the third regions may display the view 3, the openings 205 located in the fourth regions may display the view 4, and the openings 205 located in the fifth regions may display the view 5. However, it is not necessary to sequentially display the views and the display order of the views may be changed by design.

Due to arrangement of the lenses 501 and the openings 205, an image displayed by the sub-pixels PS corresponding to the openings 205 is transmitted to a viewer under the condition that the image is separated into a plurality of views by the lenses 501 so as to display the respective views without overlapping of the views.

Further, the openings 205 are located so as to correspond to the respective sub-pixels PS in a one-to-one manner, and are provided so as to maximally expose the respective sub-pixels PS. Here, the horizontal width of the openings 205 is a value acquired by dividing the horizontal width of the sub-pixel group G by k. Selection of the openings 205 will be described with reference to FIG. 3C. Here, it will be assumed that k=5 and l=1.

If k=15 and l=1, as illustrated in FIG. 3C, the horizontal width of the sub-pixel group G is the same as the horizontal width of the sub-pixel unit U.

Here, a parallelogram region having an upper side, the length of which is the same as the horizontal width of the sub-pixel groups G, an inclination angle having a value of atan(l/rk), and corresponding to the sub-pixel unit U is set. The parallelogram region is divided into k sub-parallelogram regions having the same area, each of which has the upper side having the length corresponding to a value acquired by dividing the horizontal width of the sub-pixel group G by the value of k. The respective sub-parallelogram regions have the same size and shape as those of the openings 205 and are referred to as candidate regions of the openings 205.

For example, since it is assumed that k is 5, 5 sub-parallelogram regions c1, c2, c3, c4 and c5 having the same area are formed. That is, the 5 sub-parallelogram regions c1, c2, c3, c4, and c5 correspond to candidate regions for forming the openings 205. Among the candidate regions c1, c2, c3, c4, and c5, the regions c1 and c3 overlap the largest areas of the sub-pixels SP1 and SP2. Thereby, in the illustrated sub-pixel unit U, the region c1 is selected for the first opening and the region c3 is selected for the second opening.

The openings 205 respectively have a parallelogram shape and thus, two openings 205 adjacent to each other in the vertical direction are shifted by the width of the openings 205 in the horizontal direction so that the openings 205 are arranged in a zigzag shape to the vertical direction. The stereoscopic image display device in accordance with the present invention has the shifted openings 205 and, thus, the openings 205 properly match regions acquired by dividing the area of the lens 501 by the number of views.

Accordingly, the opening 205 in accordance with the present invention has a width acquired by dividing the width of the sub-pixel group G by k, and is formed in a region which exposes the largest area of the sub-pixel PS, out of regions acquired by dividing the area of the lens 501 by k. Further, the pitch of the lenses 501 corresponds to a value acquired by multiplying width of the openings 205 by the number of views to be displayed by the display device. That is, the number of regions acquired by dividing the lens 501 by the number of views matches the number of regions provided with the openings 205. The width of the openings 205 and the width of the regions acquired by dividing the area of the lens 501 by the number of views are the same and, although the value of k and the number of views do not coincide with each other, the openings 205 and the regions, acquired by dividing the area of the lens 501 by the number of views, match each other.

Figure 5:
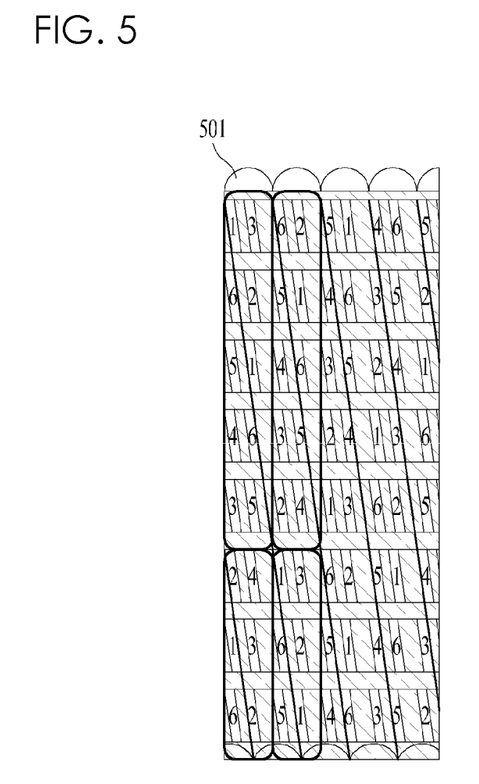
FIG. 5 is an exemplary view illustrating relations between lenses and the number of views displayed by the openings, if a value of k and the number of views do not coincide with each other.

FIG. 5 is an exemplary view illustrating relations between the lenses 501 and the number of views displayed by the openings 205, if a value of k and the number of views do not coincide with each other. Here, it will be assumed that a stereoscopic image display device displays 6 views, the value of k is 5 and the value of 1 is 1. Although the value of k is 5 and 6 views are displayed, as exemplary shown in FIG. 5, the opening 205 is located in any one of regions, acquired by dividing the area of the lens 501 by the number of views. In the stereoscopic image display device of FIG. 3, the value of k and the number of views coincide with each other and thus openings 205 arranged in the horizontal direction display only 2 views. On the other hand, in the stereoscopic image display device of FIG. 5, the value of k and the number of views do not coincide with each other and thus openings 205 arranged in the horizontal direction display all views.

The above-described value of k may be one of 3 to 10 or be one of various higher values according to the design of the present invention. If the value of k is 2, the opening 205 is inevitably larger than a light-emitting region of the sub-pixel PS. Therefore, the value of k may be greater than 2.

Figure 6:
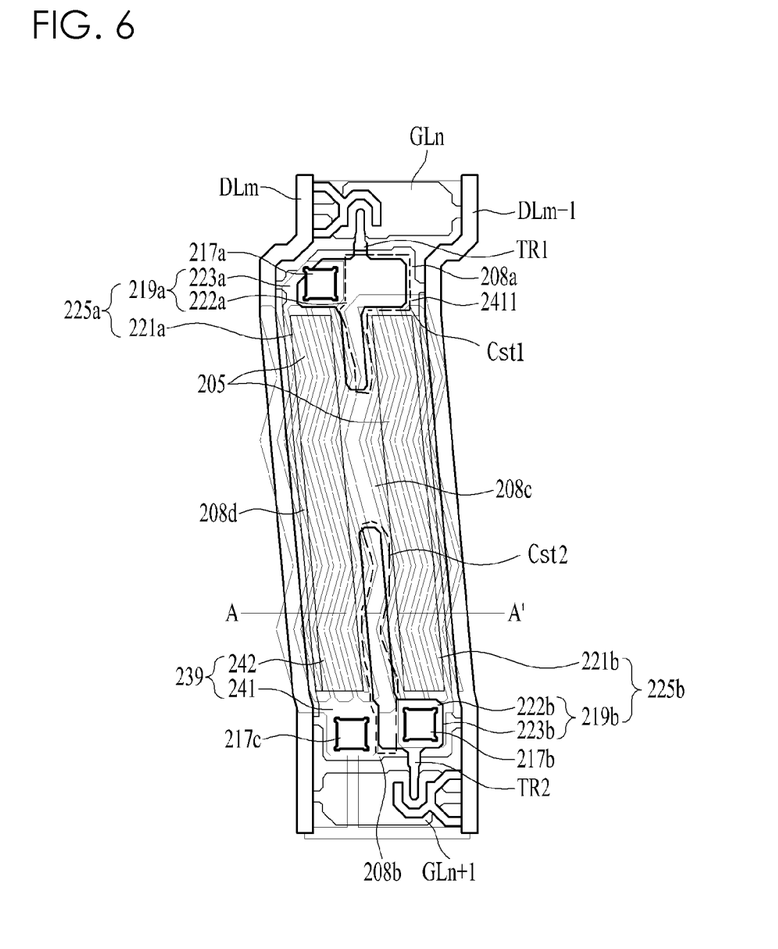
FIG. 6 is a view illustrating the detailed structure of a sub-pixel unit U of the stereoscopic image display device in accordance with an embodiment of the present invention.

FIG. 6 is a view illustrating the detailed structure of a sub-pixel unit U of the stereoscopic image display device in accordance with the present invention. Although FIG. 6 exemplary illustrates a display panel 200 as being an in-plane switching liquid crystal panel, the display panel 200 may be a TN or VA liquid crystal panel or an organic light emitting panel.

With reference to FIG. 6, the sub-pixel unit U is defined in a region formed by the $n^{th}$ gate line GLn, the $n+1^{th}$ gate line GLn+1, the $m^{th}$ data line DLm and the $m+1^{th}$ data line DLm+1. The sub-pixel unit U includes a first sub-pixel SP1 and a second sub-pixel SP2 arranged in parallel in the horizontal direction.

The respective sub-pixels SP1 and SP2 include thin film transistors Tr1 and Tr2, storage capacitors Cst1 and Cst2, pixel electrodes and a common electrode.

Common lines 208a and 208b of the display panel 200 are formed coplanar with gate lines GLn and GLn+1 and adjacent to the gate lines GLn and GLn+1 parallel to the gate lines GLn and GLn+1. Here, a common line connection part 208c is formed between the two common lines 208a and 208b passing through one sub-pixel unit U so as to cross between the sub-pixels SP1 and SP2. Here, an additional common line connection part 208d may be further formed around the data line DL. The common line connection parts 208c and 208d may function as a light-shielding pattern to shield some regions of the first and second sub-pixels SP1 and SP2, and regions of the first and second sub-pixels SP1 and SP2 not provided with the common lines 208a and 208b and the common line connection parts 208c and 208d are opened to form openings 205.

The first sub-pixel SP1 includes the first thin film transistor TR1. A gate electrode of the first thin film transistor TR1 is connected to the $n^{th}$ gate line GLn, a source electrode of the first thin film transistor TR1 is connected to the $m^{th}$ data line DLm, and a drain electrode of the first thin film transistor TR1 is connected to a first pixel electrode 225a of the first sub-pixel SP1 by a first contact hole 217a.

The second sub-pixel SP2 includes the second thin film transistor TR2. A gate electrode of the second thin film transistor TR2 is connected to the $n+1^{th}$ gate line GLn+1, a source electrode of the second thin film transistor TR2 is connected to the $m+1^{th}$ data line DLm+1, and a drain electrode of the second thin film transistor TR2 is connected to a second pixel electrode 225b of the second sub-pixel SP2 by a second contact hole 217b.

The first and second pixel electrodes 225a and 225b respectively include first and second pixel electrode connection parts 219a and 219b and a plurality of first and second pixel electrode finger parts 221a and 221b.

The first and second pixel electrode connection parts 219a and 219b respectively include metal electrodes 222a and 222b formed simultaneously with the data lines DL, and transparent electrodes 223a and 223b formed on the metal electrodes 222a and 222b and extending to the pixel electrode finger parts 221a and 221b. The metal electrodes 222a and 222b of the pixel electrode connection parts 219a and 219b may be formed in a layer above the common lines 208a and 208b and extend to some regions of a layer above the common line connection part 208c.

Figure 7:
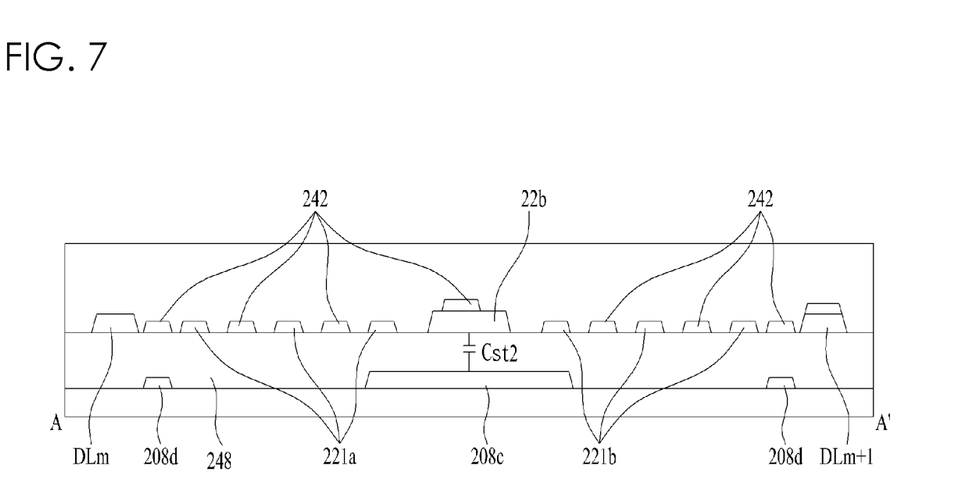
FIG. 7 is a cross-sectional view taken along line A-A' of FIG. 6.

FIG. 7 is a cross-sectional view taken along line A-A' of FIG. 6.

As illustrated in FIG. 7, an insulating layer 248 is located below the metal electrodes 222a and 222b, and above the common line connection part 208c and the common line 208a and 208b. Thus, the first and second storage capacitors Cst1 and Cst2 are formed in regions in which the common lines 208a and 208b and the metal electrodes 222a and 222b overlap and in regions in which the common line connection part 208c and the metal electrodes 222a and 222b overlap. If the metal electrodes 222a and 222b of the pixel electrode connection parts 219a and 219b extend to some regions of the layer above the common line connection part 208c, as described above, the first and second storage capacitors Cst1 and Cst2 have a shape protruding in the direction of the common line connection part 208c, as seen from the top. If the storage capacitors Cst1 and Cst2 have the protruding shape, the area of both electrodes of the storage capacitors Cst1 and Cst2 is increased and thus the capacitance of the storage capacitors Cst1 and Cst2 is also increased.

The first and second storage capacitors Cst1 and Cst2 serve to maintain the voltage that is respectively applied to the pixel electrodes and the common electrode constant until some other voltage is subsequently applied thereto.

The pixel electrode finger parts 221a and 221b are branched from the pixel electrode connection parts 219a and 219b, extend in the direction of the openings 205, and are bent multiple times in display regions corresponding to the openings 205 in the sub-pixels SP1 and SP2 so as to be arranged in a zigzag shape. Here, the pixel electrode finger parts 221a and 221b form obtuse angles at the respective bent points.

The common electrode 239 includes a common electrode connection part 241 and a plurality of common electrode finger parts 242. The common electrode connection part 241 is connected to any one of the common lines 208a and 208b by a third contact hole 217c.

The common electrode finger parts 242 are branched from the common electrode connection part 241 and arranged between the pixel electrode finger parts 221a and 221b one by one in parallel with the pixel electrode finger parts 221a and 221b. Further, the common electrode finger parts 242 may be formed in a mesh type so as to supply common voltage to all of the first and second sub-pixels SP1 and SP2 from the common line 208b connected to the third contact hole 217c. The common electrode 239 of FIG. 6 is formed in a mesh type in which the common electrode finger parts 242 are branched from the common line 208b connected to the third contact hole 217 so as to be formed throughout the sub-pixel unit. In order to form common electrode finger parts in the second sub-pixel SP2, an additional common electrode connection part 2411, which is connected to one side of any one of the common electrode finger parts 242 and branches the common electrode finger parts 242 towards the second sub-pixel SP2, is provided in the sub-pixel unit.

As apparent from the above description, a stereoscopic image display device in accordance with the present invention allows sub-pixels to have a vertical length twice that of sub-pixels of a conventional stereoscopic image display device and concentrates light emitting regions of two neighboring sub-pixels at the central part of a sub-pixel unit, thus greatly increasing brightness of the stereoscopic image display device.

Further, pixel electrode finger parts and common electrode finger parts in accordance with the present invention have a multiple-bent structure and may thus completely cope with the entirety of the light emitting regions corresponding to parallelogram-shaped openings. Therefore, the stereoscopic image display device in accordance with the present invention may display an image through the entirety of the openings without any opening compensating design and prevent brightness deviation generated due to incomplete correspondence of the openings to the light emitting regions.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A stereoscopic image display device comprising:
   a display panel including:
      a plurality of gate lines and a plurality of data lines,
      a plurality of sub-pixel units, each of the sub-pixel units being a region defined by intersecting of a first gate line and a second gate line with a first data line and a second data line, the first gate line being adjacent to the second gate line with no intervening gate line between the first gate line and the second gate line, the first data line being adjacent to the second data line with no intervening data line between the first data line and the second data line, each of the sub-pixel units including a first sub-pixel and a second sub-pixel arranged in parallel in a horizontal direction to the first sub-pixel, both the first sub-pixel and the second sub-pixel being surrounded by the first gate line, the second gate line, the first data line, and the second data line, the first sub-pixel being connected to the first gate line and the first data line, and the second sub-pixel being connected to the second gate line and the second data line to increase a vertical length of the first sub-pixel and the second sub-pixel with respect to a horizontal width of the first sub-pixel and the second sub-pixel, and
      a light-shielding pattern having a first opening for exposing at least a part of the first sub-pixel and a second opening for exposing at least a part of the second sub-pixel, the light-shielding pattern configured to shield regions of each of the sub-pixel units other than the first and second openings, wherein the first and second openings are of a shape inclined with respect to a vertical direction at an inclination angle of the first and second openings; and
   a parallax unit on the display panel and having a lens pitch corresponding to a width of the first opening multiplied by a number of views displayed by the display panel, wherein lenses of the parallax unit are inclined with respect to the vertical direction at the inclination angle of the first and second openings,
   wherein the plurality of sub-pixel units are grouped into a plurality of sub-pixel groups, each sub-pixel group including a first number of rows of sub-pixel units and a second number of columns of sub-pixel units,
   wherein the second number is smaller than the first number, and
   wherein the width of the first and second openings corresponds to a width of one sub-pixel group of the sub-pixel groups multiplied by the second number divided by the first number, wherein the width of one-sub pixel group is the second number multiplied by a width of one sub-pixel unit, and
   wherein a first sub-pixel unit and a second sub-pixel unit placed adjacent to the first sub-pixel unit is repeated, and the second sub-pixel of the first sub-pixel unit located adjacent to the first sub-pixel of the second sub-pixel unit is connected to a same data line and to different gate lines.

2. The stereoscopic image display device according to claim 1, wherein the light-shielding pattern is a common line pattern, a black matrix pattern, or is a pattern separate from the common line pattern and the black matrix pattern.

3. The stereoscopic image display device according to claim 1, wherein the first and second openings are of a parallelogram shape.

4. The stereoscopic image display device according to claim 3, wherein the inclination angle of the first and second openings corresponds to arctangent of the second number divided by a product of a ratio and the first number, wherein the ratio is based on a vertical length of the sub-pixel units to a horizontal width of the sub-pixel units.

5. The stereoscopic image display device according to claim 3, wherein:
   the second number is 1; and
   wherein each sub-pixel unit is divided into the first number of candidate regions of a same area, and the first and second openings are located in two candidate regions among the first number of candidate regions with largest areas that overlap with the first and second sub-pixels.

6. The stereoscopic image display device according to claim 1, wherein each of the first and second openings is located in any one of regions, each region corresponding to a horizontal pitch of lenses of the parallax unit divided by the number of views to be displayed; and wherein openings located in a same region display images of a same view and openings located in different regions display images of different views.

7. The stereoscopic image display device according to claim 3, wherein first and second openings adjacent to each other in the vertical direction are shifted from each other by the width of the first or second openings.

8. The stereoscopic image display device according to claim 2, wherein each of the sub-pixel units includes:
   a first thin film transistor provided with a first gate electrode and a first source electrode, the first gate electrode being connected to the first gate line, the first source electrode being connected to the first data line;
   a second thin film transistor provided with a second gate electrode and a second source electrode, the second gate electrode being connected to the second gate line, the second source electrode being connected to the second data line; and
   a common line connection part located between the first sub-pixel and the second sub-pixel to interconnect first and second common lines disposed in parallel with the gate lines.

9. The stereoscopic image display device according to claim 8, wherein the first sub-pixel includes:
   the first thin film transistor;

a first pixel electrode connection part connected to drain electrode of the first thin film transistor through a first contact hole, in a layer above a part of the first common line and the common line connection part such that an insulating film is interposed therebetween, and form a first storage capacitor protruding in a direction of the common line connection part;

a plurality of first pixel electrode finger parts extending from the first pixel electrode connection part and arranged in a zigzag shape in a vertical direction of the first sub-pixel; and a first common electrode arranged between the first pixel electrode finger parts and connected to any one of the common lines through a third contact hole.

10. The stereoscopic image display device according to claim 8, wherein the second sub-pixel includes:

the second thin film transistor;

a second pixel electrode connection part connected to a drain electrode of the second thin film transistor through a second contact hole, located in a layer above a part of the second common line and the common line connection part such that an insulating film is interposed therebetween, and thus forming a second storage capacitor protruding in a direction of the common line connection part;

a plurality of second pixel electrode finger parts extending from the second pixel electrode connection part and arranged in a zigzag shape in a vertical direction of the second sub-pixel; and a second common electrode arranged between the second pixel electrode finger parts.

11. The stereoscopic image display device according to claim 10, wherein the second common electrode is formed integrally with the first common electrode.

12. A stereoscopic image display device comprising:

a display panel comprising:

a plurality of gate lines, a plurality of data lines intersecting with the plurality of gate lines, a plurality of sub-pixel units, each of the sub-pixel units being a region defined by intersecting a first gate line and a second gate line with a first data line and a second data line, the first gate line being adjacent to the second gate line with no intervening gate line between the first gate line and the second gate line, the first data line being adjacent to the second data line with no intervening data line between the first data line and the second data line, each of the sub-pixel units including at least a first sub-pixel and a second sub-pixel adjacent to the first sub-pixel, both the first sub-pixel and the second sub-pixel being surrounded by first gate line, the second gate line, the first data line, and the second data line, the first sub-pixel being connected to the first gate line and the first data line, and the second sub-pixel being connected to the second gate line and the second data line to increase a vertical length of the first sub-pixel and the second sub-pixel with respect to a horizontal width of the first sub-pixel and the second sub-pixel, and a light shielding pattern having a first opening and a second opening, the light shielding pattern configured to shield light from the first and second sub-pixels in regions other than the first and second openings; and a plurality of lenses on the display panel, wherein the plurality of sub-pixel units arranged on the display panel are grouped into a plurality of sub-pixel groups, each sub-pixel group including a first number of rows of sub-pixel units and a second number of columns of sub-pixel units, wherein the second number is smaller than the first number, and wherein a width of the first and second openings corresponds to a width of one sub-pixel group of the sub-pixel groups multiplied by the second number divided by the first number, wherein the width of one-sub pixel group is the second number multiplied by a width of one sub-pixel unit, and wherein a first sub-pixel unit and a second sub-pixel unit placed adjacent to the first sub-pixel unit is repeated, and the second sub-pixel of the first sub-pixel unit located adjacent to the first sub-pixel of the second sub-pixel unit is connected to a same data line and to different gate lines.

13. The stereoscopic image display device according to claim 12, wherein the first and second sub-pixels in a same sub-pixel unit are at a same vertical location.

14. The stereoscopic image display device according to claim 12, wherein each of the first and second openings has a parallelogram shape having two sides extending parallel to the plurality of gate lines and remaining two sides inclined with respect to the plurality of data lines at an inclination angle, and each of areas of the lenses is inclined with respect to the plurality of data lines at the inclination angle.

15. The stereoscopic image display device according to claim 14, wherein the inclination angle is defined as an arctangent of the second number divided by a product of a ratio and the first number, and wherein the ratio is based on a vertical length of the sub-pixel units to a horizontal width of the sub-pixel units.

16. The stereoscopic image display device according to claim 12, wherein:

the second number is 1; and wherein each sub-pixel unit is divided into the first number of candidate regions of a same area, and the first and second openings are located in two candidate regions among the first number of candidate regions with largest areas that overlap with the first and second sub-pixels.

17. The stereoscopic image display device according to claim 12, wherein each of the first and second openings is located in any one of regions, each region corresponding to a horizontal pitch of the lenses by a number of views to be displayed on the display panel; and wherein openings located in a same region display images of a same view and openings located in different regions display images of different views.

18. The stereoscopic image display device according to claim 12, wherein each of the sub-pixel units comprises a common line connection part, the common line connection part located between the first and second sub-pixels to interconnect first and second common lines parallel with gate lines.

19. The stereoscopic image display device according to claim 18, wherein the first and second sub-pixels include a corresponding first and second storage capacitors, each of the first and second storage capacitors comprising an electrode extending in a direction of the common line connection part and an electrode formed by the common line connection part and having a shape protruding in a direction of the common line connection part from a plan view.

20. The stereographic image display device of claim 12, wherein the plurality of lenses have a lens pitch corresponding to a width of the first openings multiplied by a number of views displayed by the display panel.

\* \* \* \* \*